United States Patent [19]

Messina

[11] Patent Number: 5,285,768

[45] Date of Patent: Feb. 15, 1994

[54] TWO TIER GROOVE CUTTING CIRCULAR SAW BLADE WITH ANTI-UNDERCUT FEATURES

[75] Inventor: Romolo Messina, Exton, Pa.

[73] Assignee: Sanders Saws, Inc., Honey Brook, Pa.

[21] Appl. No.: 937,638

[22] Filed: Aug. 28, 1992

[51] Int. Cl.⁵ ............................ B28D 1/04; B28D 1/12
[52] U.S. Cl. .................................. 125/15; 76/112; 51/206 R; 299/89
[58] Field of Search .................. 125/15, 18, 22; 51/206 R, 206.4, 206.5, 356; 76/112, 115; 299/38, 39, 79, 89; 404/74, 87, 89, 90, 93, 94

[56] References Cited

U.S. PATENT DOCUMENTS

| | | | |
|---|---|---|---|
| 2,990,828 | 7/1961 | Hoerer | 76/112 |
| 3,363,617 | 1/1968 | Hoerer | 125/15 |
| 3,513,821 | 5/1970 | Bouvier | 51/206 R |
| 3,753,430 | 8/1973 | Oas | 125/15 X |
| 4,102,230 | 7/1978 | Magnusson et al. | 76/112 X |
| 4,267,814 | 5/1981 | Benson et al. | 125/15 |
| 4,291,667 | 9/1981 | Eichenlaub et al. | 125/15 |
| 4,821,617 | 4/1989 | Fjelkner et al. | 125/15 |
| 4,930,487 | 6/1990 | Younger | 299/89 |
| 5,012,792 | 5/1991 | Kawata et al. | 76/112 X |
| 5,197,453 | 3/1993 | Messina | 125/15 |

FOREIGN PATENT DOCUMENTS

| | | |
|---|---|---|
| 669364 | 12/1938 | Fed. Rep. of Germany . |
| 259124 | 12/1969 | U.S.S.R. . |
| 278721 | 9/1970 | U.S.S.R. ............... 51/206 R |
| 89-11953 | 12/1989 | World Int. Prop. O. . |

*Primary Examiner*—Bruce M. Kisliuk
*Assistant Examiner*—Bryan Reichenbach
*Attorney, Agent, or Firm*—Michael R. Swartz; John R. Flanagan

[57] ABSTRACT

A two-tier groove cutting circular saw blade includes a circular core having sectors defined in circumferentially spaced relation to one another along the periphery, and lands defined in circumferentially spaced relation to one another between the periphery and center of the core. Pluralities of outer and inner cutting segments are secured to the respective core sectors and lands. First and second pluralities of anti-undercut elements are defined on the core respectively between the center and periphery thereof and along the periphery thereof between preselected ones of the lands and sectors for defining first and second exit paths away from the inner and outer cutting segments for flow of material particles generated from the cutting of the groove and flushing of the groove by fluid coolant so as to reduce wear and undercutting of the core adjacent to the inner and outer cutting segments. The core has an outer annular portion extending between the lands and sectors of the core and an inner annular portion extending between the lands and the center of the core. The thickness of the inner annular portion of the core is greater than the thickness of the outer annular portion of the core.

17 Claims, 2 Drawing Sheets

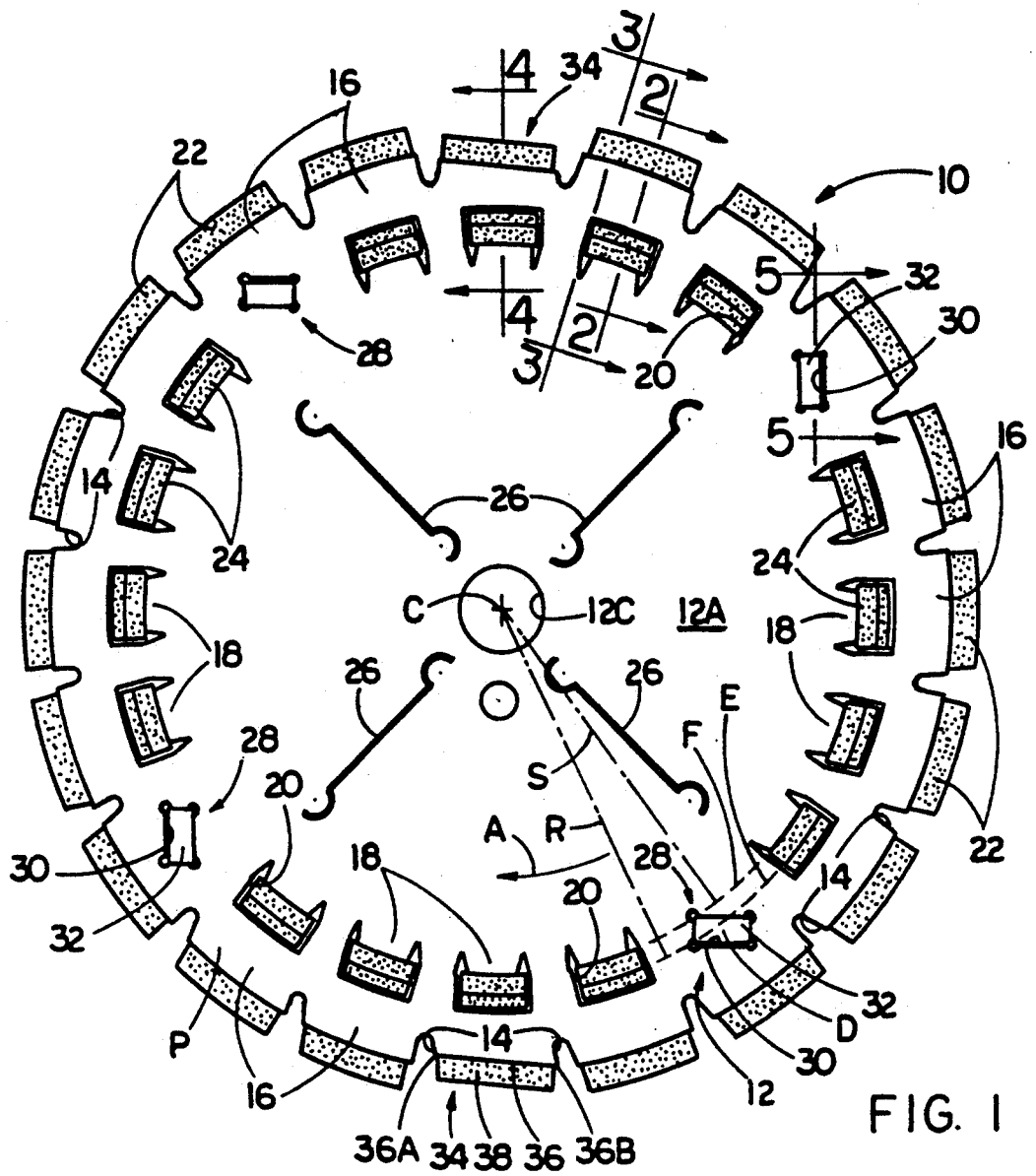
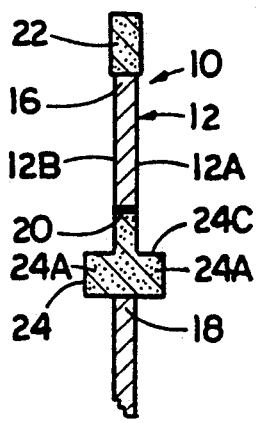 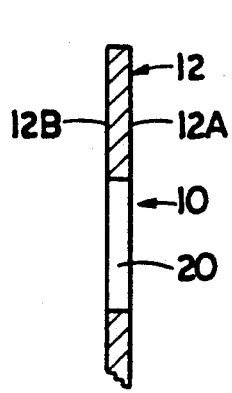 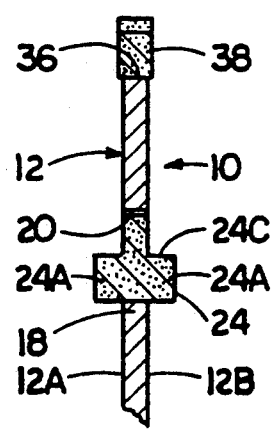 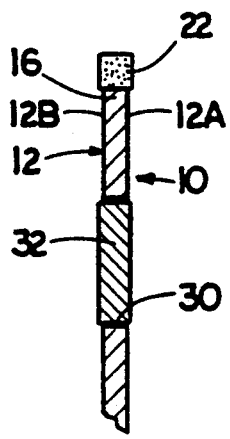
FIG. 2   FIG. 3   FIG. 4   FIG. 5

TWO TIER GROOVE CUTTING CIRCULAR SAW BLADE WITH ANTI-UNDERCUT FEATURES

CROSS-REFERENCE TO RELATED APPLICATION

Reference is hereby made to the following copending U.S. patent application dealing with related subject matter and assigned to the assignee of the present invention: "Two-Tier Groove Cutting Circular Saw Blade With Multiple Core Assembly" by Romolo Messina, assigned U.S. Ser. No. 07/937,635 and filed Aug. 28, 1992, now U.S. Pat. No. 5,197,453, issued Mar. 30, 1993.

BACKGROUND OF THE INVENTION

1. Field of the Invention

The present invention generally relates to circular saw blades used to cut a two-tier expansion groove in a concrete surface or the like and, more particularly, is concerned with features incorporated in such blades which reduce wear, increase structural integrity, and prolong useful life of the blades.

2. Description of the Prior Art

It is common practice to cut two-tier grooves in concrete surfaces or the like in order to provide expansion joints therein. The grooves are filled with a compression sealant of neoprene or other similar synthetic rubber-like material which allows the grooves to function as expansion joints in response to temperature-induced expansion or contraction. Until recently the two-tier groove has been made in two cutting passes. In the initial pass, a first narrow groove is cut having the maximum desired depth of the two-tier groove. In the final pass, a second wider groove is cut into the surface superimposed over the first narrower groove but to a lesser depth than the first groove.

More recently, in U.S. Pat. No. 4,930,487 to Younger, a design of a circular saw blade has been proposed for cutting the two-tier groove in a single pass. The saw blade of this patent includes a circular core of uniform thickness having a plurality of outer cutting segments secured to circumferentially spaced support sectors defined about the periphery of the blade core and a plurality of inner cutting segments disposed in openings and secured to support lands defined in the blade core between the periphery and the center of the blade. In order to cut the two tier groove, it is necessary that the outer cutting segments be wider than the blade core and that the inner cutting segments be wider than both the outer cutting segments and blade core. In one pass of the saw blade, the outer cutting segments will cut the deeper and narrower tier of the groove, whereas the inner cutting segments will cut the shallower and wider tier of the groove above the deeper narrower tier of the groove.

For such applications, it is common practice to continuously flush the cutting area during the cutting operation with a fluid coolant in order to keep the blade as cool as possible. The coolant also serves to flush loose rock-like material, spent abrasive, and the like from the cutting site, all of which in combination with the coolant is generally referred to in the art and throughout the subject application as "swarf".

Although the design of the circular saw blade of the Younger patent represents a step in the right direction toward achieving the cutting of a two-tier expansion groove in a single pass operation, nonetheless there are certain drawbacks with the design. The first drawback is that swarf tends to flow in a path that contacts and causes abrasion and erosion of the blade core in a manner which is commonly referred to as "undercutting". The undercutting occurs at core portions located adjacent to and radially inwardly from where the outer and inner cutting segments are attached to the blade core because the lateral portions of the outer and inner cutting segments extend beyond opposite surfaces of the core and tangentially intersect with the swarf flow path. Such undercutting of the blade core can significantly reduce the life of the blade necessitating its early replacement. The second drawback is that the blade core is of substantially uniform thickness. Given the greater width of the inner cutting segments than the outer cutting segments for cutting the wider upper tier of the groove, there is inadequate structure in the blade core for attaching the inner cutting segments thereto in a way which will withstand the forces imposed on the inner cutting segments during cutting of the upper tier of the groove.

Consequently, a need exists for improvements which will reduce undercutting of the blade core and increase the structural integrity of the blade core so as to allow for the employment of the circular saw blade over a longer normal useful life.

SUMMARY OF THE INVENTION

The present invention provides a circular saw blade designed to satisfy the aforementioned needs. The circular saw blade of the present invention provides features which improve resistance to core undercutting and increase the structural integrity of the core so as to thereby prolong the useful life of the blade core and the costly abrasive cutting segments mounted thereto.

Accordingly, the present invention is directed to improved features in a two-tier groove cutting circular saw blade. The saw blade comprises: (a) a substantially circular core having a center, a periphery and a pair of opposite surfaces, the core including a plurality of sectors defined in circumferentially spaced relation to one another relative to the center and along the periphery of the core, and a plurality of lands defined in circumferentially spaced relation to one another relative to the center and between the periphery and center of the core; (b) a plurality of outer cutting segments secured to the respective sectors of the core, each outer cutting segment having a width greater than the thickness of the core between the opposite surfaces thereof extending between the sectors and the lands of the core such that the outer cutting segments extend beyond the opposite surfaces of the core and are operable for cutting a first tier of a groove in a concrete surface; and (c) a plurality of inner cutting segments secured to the respective lands of the core, each inner cutting segment having a width greater than the width of each outer cutting segment and greater than the thickness of the core between the opposite surfaces thereof extending between the lands and center of the core such that the inner cutting segments extend beyond the opposite surfaces of the core and are operable for cutting a second tier of the groove in the concrete surface being superimposed on and shallower than the first tier of the groove.

One of the improved features incorporated in the saw blade of the present invention is an inner means on the core at predetermined locations between the center and periphery thereof and between preselected ones of the lands thereof for defining an exit path away from the inner cutting segments for flow of material particles generated from the cutting of the groove and flushing of the groove by fluid coolant so as to reduce wear and undercutting of the core adjacent to the inner cutting segments. The inner means includes a plurality of openings defined in the core at the predetermined locations and a plurality of filler segments disposed in the openings and secured to the core. The openings and filler segments are less in number than the lands of the core and inner cutting segments. Each filler segment has a width greater than the thickness of the core adjacent thereto and less than the width of each inner cutting segment such that the filler segments extend beyond the opposite surfaces of the core through an extent less than that through which the inner cutting segment extends beyond the opposite surfaces of the core.

Another of the improved features incorporated in the saw blade of the present invention relates to the thickness of the core of the blade. The core has an outer annular portion extending between the sectors and lands thereof and an inner annular portion extending between the lands and center thereof. The thickness of the core between the opposite surfaces thereof along the inner annular portion thereof are greater than the thickness of the core between the opposite surfaces thereof along the outer annular portion thereof.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a side elevational view of one embodiment of an improved circular saw blade of the present invention for cutting a two-tier groove in a concrete surface or the like.

FIG. 2 is an enlarged fragmentary sectional view of the blade taken along line 2—2 of FIG. 1.

FIG. 3 is another enlarged fragmentary sectional view of the blade taken along line 3—3 of FIG. 1.

FIG. 4 is still another enlarged fragmentary sectional view of the blade taken along line 4—4 of FIG. 1.

FIG. 5 is yet another enlarged fragmentary sectional view of the blade taken along line 5—5 FIG. 1.

FIG. 6 is a side elevational view of another embodiment of an improved circular saw blade of the present invention for cutting a two-tier groove in a concrete surface or the like.

DETAILED DESCRIPTION OF THE INVENTION

Figure 6:
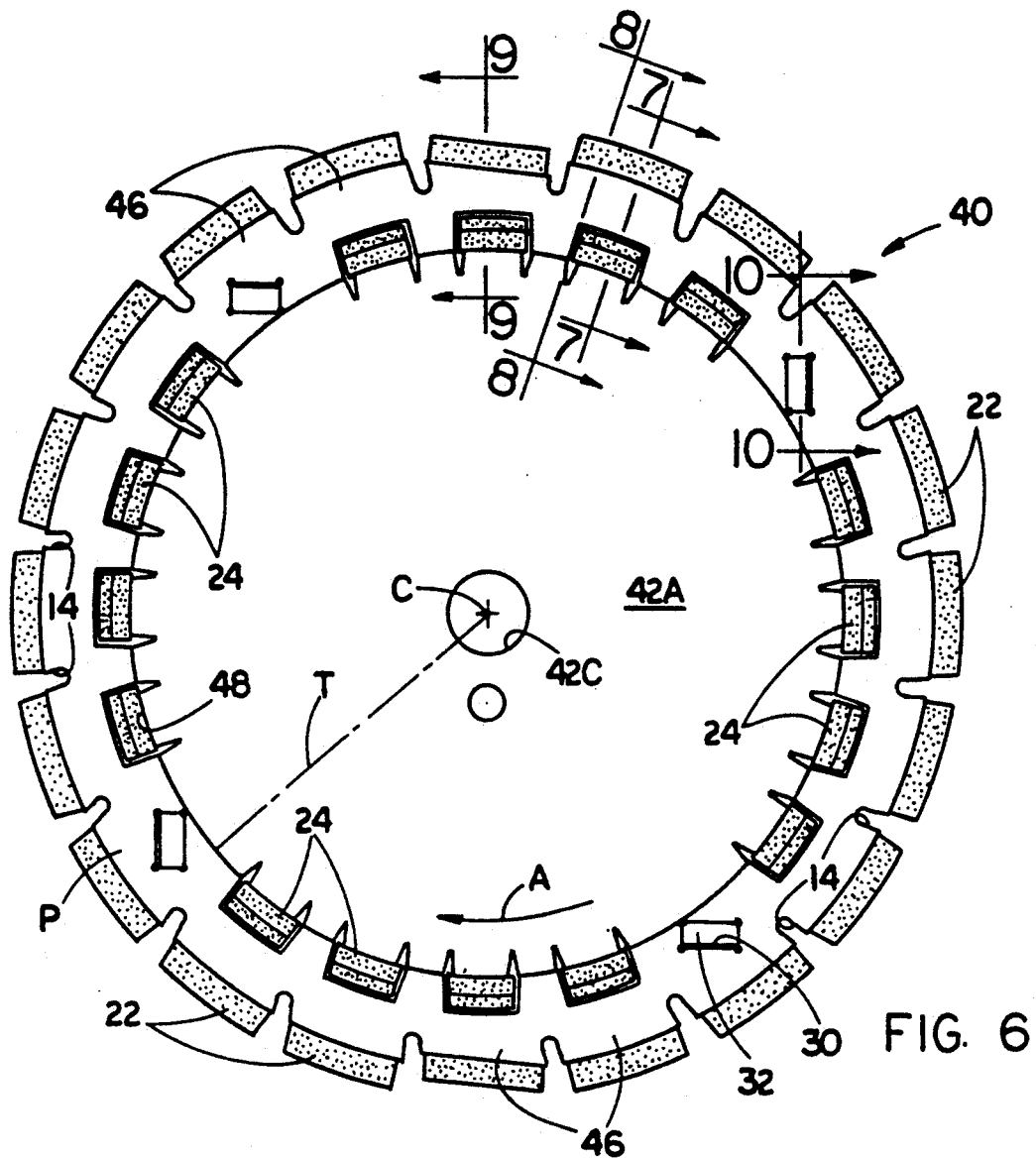

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1-5, there is illustrated one embodiment of an improved circular saw blade of the present invention, generally designated 10, being adapted particularly for cutting a two-tier groove in a concrete surface or the like. The blade 10 basically includes a substantially circular disk-like core 12 having a pair of opposite surfaces 12A, 12B and a central mounting hole 12C defined therethrough concentric with a center C of the blade 10.

The core 12 of the blade 10, preferably constructed of steel, has circumferentially-spaced radial slots 14 formed therein which open at a periphery P of the core 12 and extend radially inward a short distance toward the center C of the blade 10. The core 12 also has a plurality of sectors 16 defined between the slots 14 in circumferentially spaced relation to one another relative to the center C of the core 12 and along the periphery P thereof. The core 12 further has a plurality of lands 18 defined in circumferentially spaced relation to one another relative to the center C of the core 12 and between the periphery P and the center C of the core 12. Preferably, the lands 18 are radially aligned with the sectors 16 relative to the center C of the core 12. The core 12 also has a plurality of windows 20 defined therethrough, such as by being laser cut, above the respective lands 18.

The blade 10 also includes a plurality of outer cutting segments 22 fabricated of material containing diamond particles. The sectors 16 are arcs of a circle defined by the radius of the core 12 rotated about the center C thereof. The outer cutting segments 22, having the same curved shape as the sectors 16, are secured to the sectors 16 in any suitable manner, such as by joints or bonds formed conventionally by soldering or brazing or laser welding. Each outer cutting segment 22 has a width greater than the thickness between the opposite surfaces 12A, 12B of the core 12 extending between the sectors 16 and lands 18 of the core 12 such that the outer cutting segment 22 has opposite lateral portions 22A extending beyond the opposite surfaces 12A, 12B of the core 12. The outer cutting segments 12 are thus operable for cutting a first tier of the two-tier groove in the concrete surface.

The blade 10 further includes a plurality of inner cutting segments 24 fabricated of a similar material or the same material as the outer cutting segments 22 and secured to the lands 18. Each inner cutting segment 24, having an inverted T-shaped configuration in cross section, also extends through a corresponding one of the windows 20 in the core 12. Each inner cutting segment 24 has a width greater than the width of each outer cutting segment 22 and greater than the thickness between the opposite surfaces 12A, 12B of the core 12 extending between the lands 18 and the center C of the core 12 such that the inner cutting segments 24 have opposite lateral portions 24A extending beyond the opposite surfaces 12A, 12B of the core 12. The inner cutting segments 24 are thus operable for cutting a second tier of the groove in the concrete surface which is superimposed on and shallower than the first tier of the groove. The blade 10 further includes a plurality of narrow deformation resistant slots 26 defined on the core 12 and extending between selected ones of the lands 18 and the center C of the core 12. The deformation resistant slots 26 resist deformation of the core 12 during brazing and laser welding of the outer and inner cutting segments 22, 24 thereon and reduces noise during operation thereof.

Referring to FIGS. 1 and 5, one of the improved features of the present invention incorporated in the circular saw blade 10 is an inner means 28 on the core 12 at predetermined locations between the center C and periphery P thereof and between preselected ones of the lands 18 thereof for defining a first exit path away from the center C of the core 12 and from the inner cutting segments 24 for flow of material particles (swarf) generated from the cutting of the groove and flushing of the groove by fluid coolant. Providing the path for exiting of the material particles minimizes the dwell time of the swarf within the groove and thereby minimizes engagement of the swarf with the core 12 adjacent to and radially inwardly from the opposite lateral portions 24A of the inner cutting segments 24, resulting in reduction of wear and undercutting of the core 12 at these locations.

More particularly, the inner means 28 includes a plurality of openings 30 defined through the core 12 at the predetermined locations and a plurality of filter segments 32 disposed in the openings 30 and secured to the core 12, such as by the same methods of securement used to attach the outer and inner cutting segments 22, 24 respectively to the sectors 16 and lands 18. There are fewer openings 30 and filler segments 32 utilized than lands 18 and inner cutting segments 24. Preferably, four openings 30 and filler segments 32 are employed, whereas sixteen lands 18 and inner cutting segments 24 are provided, the specific number of openings 30, filler segments 32, lands 18 and inner cutting segments 24 being dependent upon the size of the blade 10. Each filler segment 32 preferably has a width greater than the thickness of the core 12 adjacent thereto and less than the width of each inner cutting segment 24 such that the filler segment 32 extends beyond the opposite surfaces 12A, 12B of the core 12 through an extent less than that through which the inner cutting segment 24 extends beyond the opposite surfaces 12A, 12B of the core 12.

Further, each opening 32 of the inner means 28 is located on the core 12 such that a center D of the opening 32 lies on a circle E generated about the center C of the core 12 by a radius R extending from the center C of the core 12 to a cutting edge 24C of the inner cutting segment 24. Also, each opening 32 of the inner means 28 has an inner edge portion 32A which lies on a circle F generated about the center C of the core 12 by a radius S extending from the center C of the core 12 to the lands 18 of the core. Further, each opening 32 has a rectangular configuration and length and width dimensions extending substantially parallel to respective orthogonal axes which extend through the center C of the core 12.

The blade 10 also includes outer means 34 on the core 12 at predetermined places along the periphery thereof and between preselected ones of the sectors 16 thereof for defining a second exit path away from the outer cutting segments 22 for flow of material particles generated from the cutting of the groove and flushing of the groove by fluid coolant. The exiting of the material particles (swarf) reduce wear and undercutting of the core 12 adjacent to the outer cutting segments 22. The outer means 34 includes at least a pair of platforms 36 defined in the core 12 at the predetermined places being preferably angular displaced from one another through 180°. Each platform 36 has an inclined orientation, being closer at one end 36A to the center C of the core than at an opposite end 36B thereof. The closer end 36A is the leading end of the platform 36 relative to the intended direction of rotation of the blade 10, as denoted by the arrow A in FIG. 1. The outer means 34 also includes a filler segment 38 secured to each platform 36 of the core. The platforms 36 and filler segments 38 are less in number than the sectors 16 and outer cutting segments 22. By way of example, there are two platforms 36 and filler segments 38, whereas there are eighteen sectors 16 and outer cutting segments 22. Again, the specific number of platforms 36, filler segments 38, sectors 16 and outer cutting segments 22 is determined by the size or diameter of blade 10.

Figure 7:
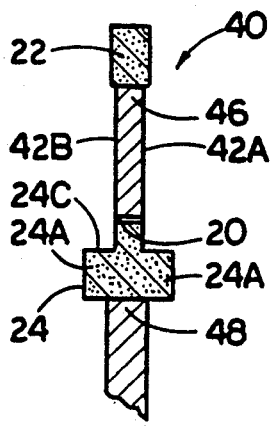
FIG. 7 is an enlarged fragmentary sectional view of the blade taken along line 7—7 of FIG. 6.
Figure 8:
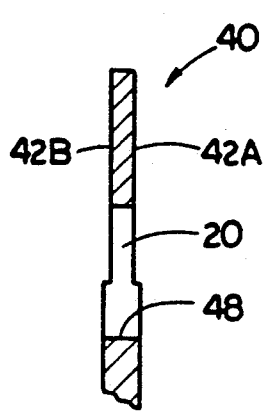
FIG. 8 is another enlarged fragmentary sectional view of the blade taken along line 8—8 of FIG. 6.
Figure 9:
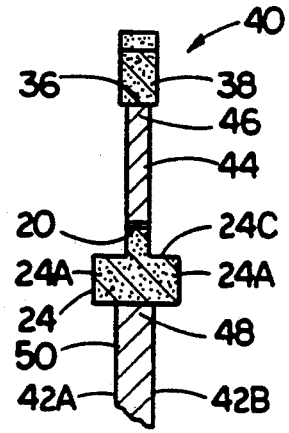
FIG. 9 is still another enlarged fragmentary sectional view of the blade taken along line 9—9 of FIG. 6.
Figure 10:
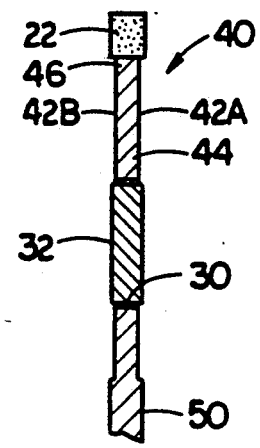
FIG. 10 is yet another enlarged fragmentary sectional view of the blade taken along line 10—10 of FIG. 6.

Referring now to FIGS. 6-10, there is illustrated a somewhat modified embodiment of an improved circular saw blade 40 of the present invention. Another of the improved features of the present invention incorporated in the saw blade 40 relates to the thickness of the core 42 of the blade. The saw blade 10 of FIGS. 6-10 differs from the saw blade 10 of FIGS. 1-5 only in that the core 42 of the blade 40 has two different thicknesses rather than a single thickness as is the case in FIGS. 1-5. More particularly, the core 42 of the blade 40 has an outer annular portion 44 which extends between sectors 46 and lands 48 of the core 42, and an inner annular portion 50 which extends between the lands 48 and the center C of the core 42. The thickness of the core 42 between the opposite surfaces 42A, 42B thereof along the inner annular portion 50 thereof is greater than the thickness of the core 42 between the opposite surfaces 42A, 42B thereof along the outer annular portion 44 thereof. Thus, the lands 48 supporting the inner cutting segments 24 lie on a circle generated about the center C of the core 42 by a radius T extending from the center C of the core 42 to an outer peripheral edge of the thicker inner annular portion 50. The greater thickness of the inner annular portion 50 of the core 42 provides greater surface area on which to attach the inner cutting segments 24 which extend through the windows 20 defined in the outer annular portion 44 of the core 42 above the respective lands 48. The blade 40 has greater strength and stability.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A circular saw blade for cutting a two-tier groove in a concrete surface, comprising:
   (a) a substantially circular core having a center, a periphery and a pair of opposite surfaces, said core including a plurality of sectors defined in circumferentially spaced relation to one another relative to said center and along said periphery of said core, said core also including a plurality of lands defined in circumferentially spaced relation to one another relative to said center and between said periphery and center of said core;
   (b) a plurality of outer cutting segments secured to said respective sectors of said core, each said outer cutting segment having a width greater than the thickness of said core between said opposite surfaces thereof extending between said sectors and said lands of said core such that said outer cutting segments extend beyond said opposite surfaces of said core and are operable for cutting a first tier of a groove in a concrete surface;

(c) a plurality of inner cutting segments secured to said respective lands of said core, each said inner cutting segment having a width greater than the width of each said outer cutting segment and greater than the thickness of said core between said opposite surfaces thereof extending between said lands and center of said core such that said inner cutting segments extend beyond said opposite surfaces of said core and are operable fur cutting a second tier of the groove in the concrete surface being superimposed on the shallower than the first tier of the groove; and (d) inner means on said core at predetermined locations between said center and periphery thereof and between preselected ones of said lands thereof for defining a first exit path away from said inner cutting segments for flow of material particles generated from the cutting of the groove and flushing of the groove by fluid coolant so as to reduce wear and undercutting of said core adjacent to said inner cutting segments, said inner means including a plurality of openings defined through the core at said predetermined locations and a plurality of filler segments disposed in said openings and secured to portions of said core adjacent to said openings.

2. The blade as recited in claim 1 wherein each said opening of said inner means has a center which lies on a circle generated about said center of said core by a radius extending from said center of said core to a cutting edge of said inner cutting segment.

3. The blade as recited in claim 1 wherein each said opening of said inner means has an inner edge portion which lies on a circle generated about said center by a radius extending from said center of said core to said lands of said core.

4. The blade as recited in claim 1 wherein each said opening is rectangular in configuration and has length and width dimensions extending substantially parallel to respective orthogonal axes which extend through said center of said core.

5. The blade as recited in claim 1 wherein said openings and said filler segments are less in number than said lands of said core and said inner cutting segments.

6. The blade as recited in claim 1, wherein each said filler segment has a width greater than the thickness of said core adjacent thereto and less than the width of each said inner cutting segment such that said filler segment extends beyond said opposite surfaces of said core through an extent less than that through which said inner cutting segment extends beyond said opposite surfaces of said core.

7. The blade as recited in claim 1 further comprising: a plurality of deformation resistant slots defined on said core and extending between selected ones of said lands and said center of said core.

8. The blade as recited in claim 1 wherein said lands are radially aligned with said sectors relative to said center of said core.

9. The blade as recited in claim 1 wherein said core includes a plurality of windows defined therethrough each being disposed adjacent to one of said lands spaced from said periphery of said core and located between said land and said core periphery.

10. The blade as recited in claim 9 wherein each said inner cutting segments secured on one of said lands extends through a corresponding one of said windows and is disposed adjacent said one land.

11. A circular saw blade for cutting a two-tier groove in a concrete surface, comprising:

(a) a substantially circular core having a center, a periphery and a pair of opposite surfaces, said core including a plurality of sectors defined in circumferentially spaced relation to one another relative to said center and along said periphery of said core, said core also including a plurality of lands defined in circumferentially spaced relation to one another relative to said center and between said periphery and center of said core;

(b) a plurality of outer cutting segments secured to said respective sectors of said core, each said outer cutting segment having a width greater than the thickness of said core between said opposite surfaces thereof extending between said sectors and said lands of said core such that said outer cutting segments extend beyond said opposite surfaces of said core and are operable for cutting a first tier of a groove in a concrete surface;

(c) a plurality of inner cutting segments secured to said respective lands of said core, each said inner cutting segment having a width greater than the width of each said outer cutting segment and greater than the thickness of said core between said opposite surfaces thereof extending between said lands and center of said core such that said inner cutting segments extend beyond said opposite surfaces of said core and are operable fur cutting a second tier of the groove in the concrete surface being superimposed on the shallower than the first tier of the groove; and (d) inner means on said core at predetermined locations between said center and periphery thereof and between preselected ones of said lands thereof for defining a first exit path away from said inner cutting segments for flow of material particles generated from the cutting of the groove and flushing of the groove by fluid coolant so as to reduce wear and undercutting of said core adjacent to said inner cutting segments, said inner means including a plurality of openings defined through the core at said predetermined locations and a plurality of filler segments disposed in said openings and secured to portions of said core adjacent to said openings; and (e) said core having an outer annular portion extending between said sectors and lands thereof and an inner annular portion extending between said lands and center thereof, said thickness of said core between said opposite surfaces thereof along said inner annular portion thereof being greater than the thickness of said core between said opposite surfaces thereof along said outer annular portion thereof.

12. The blade as recited in claim 11 wherein each said lands supporting said inner cutting segments lie on a circle generated about said center of said core by a radius extending from said center of said core to an outer peripheral edge of said inner annular portion.

13. The blade as recited in claim 11 wherein said core including a plurality of windows defined therethrough each being disposed adjacent to one of said lands spaced from said periphery of said core and located between said land and said core periphery.

14. The blade as recited in claim 13 wherein each said inner cutting segment secured on one of said lands extends through a corresponding one of said windows and is disposed adjacent said one land.

15. A circular saw blade for cutting a two-tier groove in a concrete surface, comprising:

(a) a substantially circular core having a center, a periphery and a pair of opposite surfaces, said core including a plurality of sectors defined in circumferentially spaced relation to one another relative to said center and along said periphery of said core, said core also including a plurality of lands defined in circumferentially spaced relation to one another relative to said center and between said periphery and center of said core, said core further including a plurality of windows defined therethrough each being disposed adjacent to one of said lands spaced from said periphery of said core and located between said land and said core periphery;

(b) a plurality of outer cutting segments secured to said respective sectors of said core, each said outer cutting segment having a width greater than the thickness of said core between said opposite surfaces thereof extending between said sectors and said lands of said core such that said outer cutting segments extend beyond said opposite surfaces of said core and are operable for cutting a first tier of a groove in a concrete surface;

(c) a plurality of inner cutting segments secured to said respective lands of said core and extending through said respective windows adjacent to said lands, each said inner cutting segment having a width greater than the width of each said outer cutting segment and greater than the thickness of said core between said opposite surfaces thereof extending between said lands and center of said core such that said inner cutting segments extend beyond said opposite surfaces of said core and are operable fur cutting a second tier of the groove in the concrete surface being superimposed on the shallower than the first tier of the groove; and (d) inner means on said core at predetermined locations between said center and periphery thereof and between and spaced from preselected ones of said windows thereof for defining a first exit path away from said inner cutting segments for flow of material particles generated from the cutting of the groove and flushing of the groove by fluid coolant so as to reduce wear and undercutting of said core adjacent to said inner cutting segments, said inner means including a plurality of openings defined through the core at said predetermined locations and a plurality of filler segments disposed in said openings and secured to portions of said core adjacent to said openings; and (e) outer means on said core at predetermined places along said periphery thereof and between preselected ones of said sectors thereof for defining a second exit path away from said outer cutting segments for flow of material particles generated from the cutting of the groove and flushing of the groove by fluid coolant so as to reduce wear and undercutting of said core adjacent to said outer cutting segments, said outer means including at least a pair of platforms defined in the core at said predetermined places, said platform at one end being closer to said center of said core than at an opposite end of said platform.

16. The blade as recited in claim 15 wherein said outer means includes a plurality of filler segments secured to said platform of said core.

17. The blade as recited in claim 16 wherein said platforms and said filler segments are less in number than said sectors of said core and said outer cutting segments.

* * * * *